MULTIPLEX SIGNAL TRANSFER SYSTEM

Filed Oct. 9, 1967

INVENTORS D. A. HARMS
B. T. MURPHY
BY R. C. Winter
ATTORNEY

MULTIPLEX SIGNAL TRANSFER SYSTEM

Filed Oct. 9, 1967 2 Sheets-Sheet 2

United States Patent Office 3,519,751

Patented July 7, 1970

3,519,751
MULTIPLEX SIGNAL TRANSFER SYSTEM

David A. Harms, Glen Ellyn, Ill., and Bernard T. Murphy, New Providence, N.J., assignors to Bell Telephone Laboratories, Incorporated, Murray Hill and Berkeley Heights, N.J., a corporation of New York Filed Oct. 9, 1967, Ser. No. 673,573
Int. Cl. H04j *3/00;* H04q *11/04*
U.S. Cl. 179—15 12 Claims

ABSTRACT OF THE DISCLOSURE

A multiplex signal transfer circuit for a communication system is disclosed in which signals for transmission between lines in communication are coded in binary form. Stored designations of all of the communicating lines are scanned in sequence during a repetitive cycle. Signal transfer is effected by altering a charge stored in each line coding and decoding circuit during each cycle dependent upon the type of outgoing signal detected during the cycle.

BACKGROUND OF THE INVENTION

Figure 2:
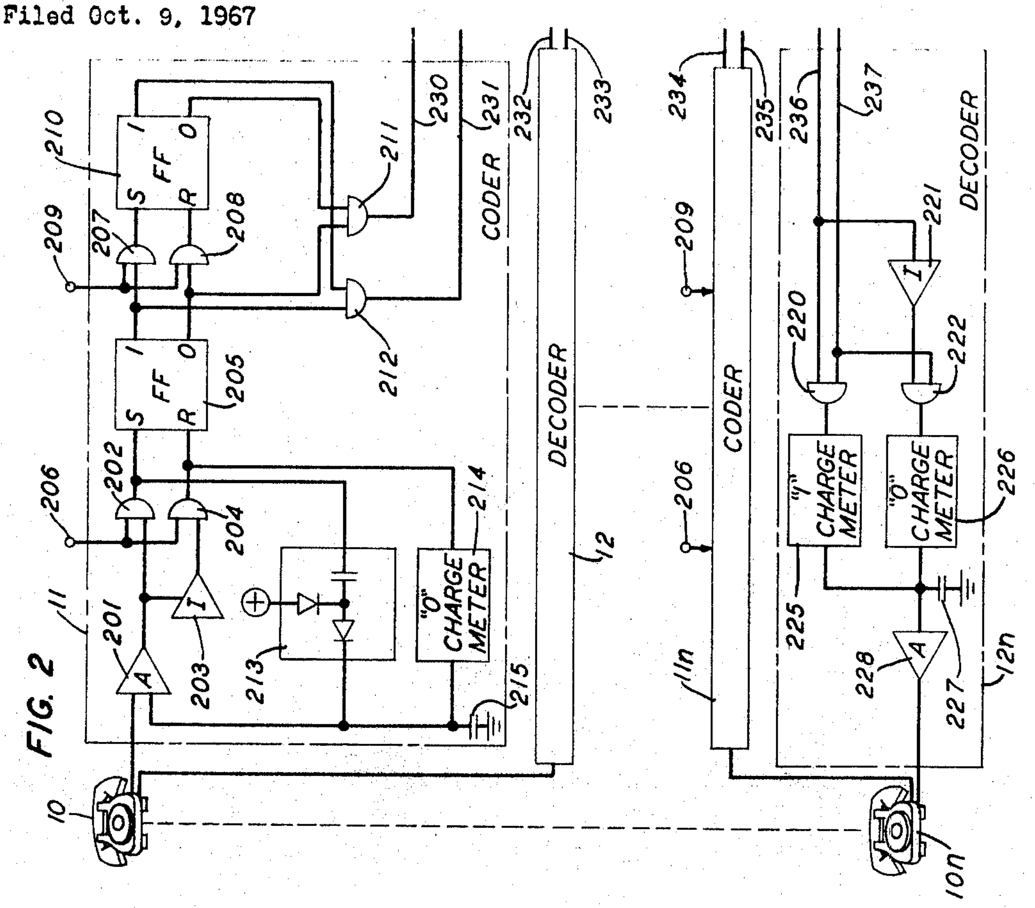

In a typical time division multiplex switching system, delta modulation techniques may be employed for coding and decoding of signals transmitted through the system. A conventional delta modulation system comprises a coder which converts analog intelligence signals to binary coded "ones" and "zeros." The amplitude of the intelligence signal determines the sequence of "ones" and "zeros" provided at the output of the coder. By means of a feedback circuit, each sample of the outgoing signal is compared with a representation of the preceding sample which has been demodulated in an integrating capacitor in the feedback circuit. If the outgoing signal sample is larger than the feedback signal sample, the coder output will be in a "zero" state.

A time slot is assigned to each active line, and a delta signal sample (either a "one" or a "zero") is transmitted directly between the communicating pair of lines in the assigned time slot in each repetitive cycle of time slots. This, of course, requires that a finite time interval be allotted each pair of communicating lines in each cycle of operation, irrespective of whether or not an intelligence signal is available for transfer. The sampling frequency of the system determines the maximum signal to quantizing noise ratio. The requisite sampling rate depends upon both signal frequency and amplitude.

Such a system necessarily is synchronized so that one of a pair of communicating lines can be sampled in a particular time slot and the other line in the pair can receive the signal sample in a predetermined time slot in the same or a later cycle of time slots or frame, depending upon the transmission delay encountered in the system. Time slots are assigned to the communicating lines in sequence in each frame. Thus an upper limit is placed on the number of simultaneous conversations which can be handled despite the fact that intelligence signals are not being transmitted during a large proportion of each frame.

In a patent application of D. A. Harms, Ser. No. 628,969 filed Apr. 6, 1967, an asynchronous control arrangement is provided which asures that each time slot is occupied with an intelligence signal transfer. This is facilitated by the manner of signal transfer which is radically different from that utilized theretofore; in fact, no intelligence signals, coded or otherwise, are transmitted between lines in communication. Instead, a memory unit stores the addresses of all communicating lines in the system, which addresses are scanned repetitively in sequence. Outgoing intelligence signals again are converted by a delta modulator, comprising the coder in each line circuit, into the usual binary "one" and "zero" pulses. However, instead of a direct conversion of the binary coded output pulse to analog form in the integrating capacitor of the feedback circuit according to conventional delta modulation practice, the feedback circuit stores a predetermined charge which is appreciably larger than the output "one" pulse. The delta demodulator comprising the decoder in each line circuit also stores this predetermined charge. Upon receipt of an outgoing "one" pulse from a sending line, the memory scan is stopped, and a first control signal is applied to the sending line coder and to the receiving line decoder to transfer the stored predetermined charge to the integrating capacitor in the respective coder and decoder. Upon completion of the memory scan, a second control signal is transmitted to the coder and decoder of all communicating lines. This second control signal serves to reduce the predetermined charge on the integrating capacitor in the sending line coder and in the receiving line decoder to a level corresponding to the original outgoing signal. In those instances in which a "one" pulse is not received from a sending line during the cycle, the control signal applied at the end of the cycle serves to store a quantity of charge corresponding to the "zero" pulse on the integrating capacitor of the sending line coder and receiving line decoder.

SUMMARY OF THE INVENTION

In accordance with this invention operational timing is reduced markedly over that achieved in the aforementioned Harms arrangement by permitting signal transfer between stations in communication only when a sequence of identical binary coded signals are available at the originating station. This approach recognizes that every binary "one" pulse does not indicate that a change in the outgoing intelligence pattern has occurred; for example, the delta modulator will generate a 101010 pattern during silent intervals. The transfer of "one" pulses from such a pattern between stations in communication is unnecessary and wastes valuable scanner time. By transferring signals only when a transition occurs between consecutive binary coded outgoing intelligence signal samples, such operations are obviated.

In one illustrative embodiment the improved dynamic signal transfer operation is accomplished by the provision of a pair of coder storage devices in which consecutive, outgoing, intelligence signal samples are registered in binary form. Additional logic circuitry then serves to compare the stored binary digits and to transmit control signals to the scanner only when a digit match is detected.

DRAWING

Figure 1:
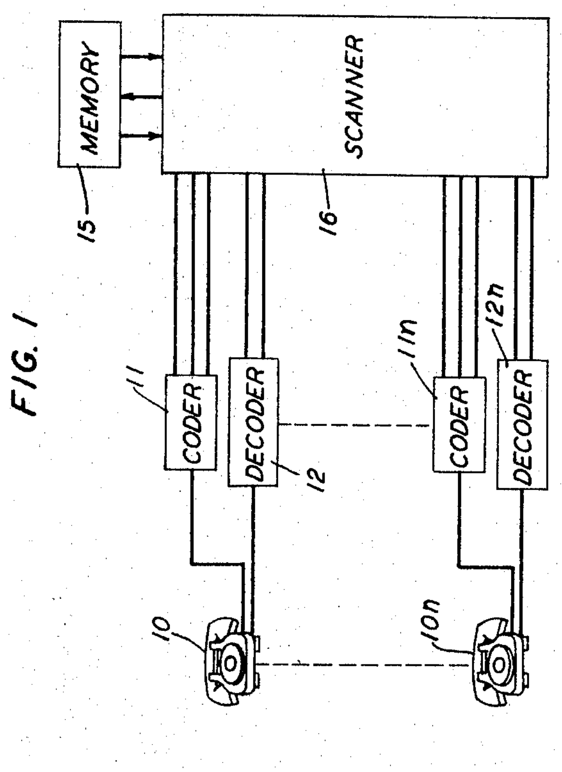
Figure 3:
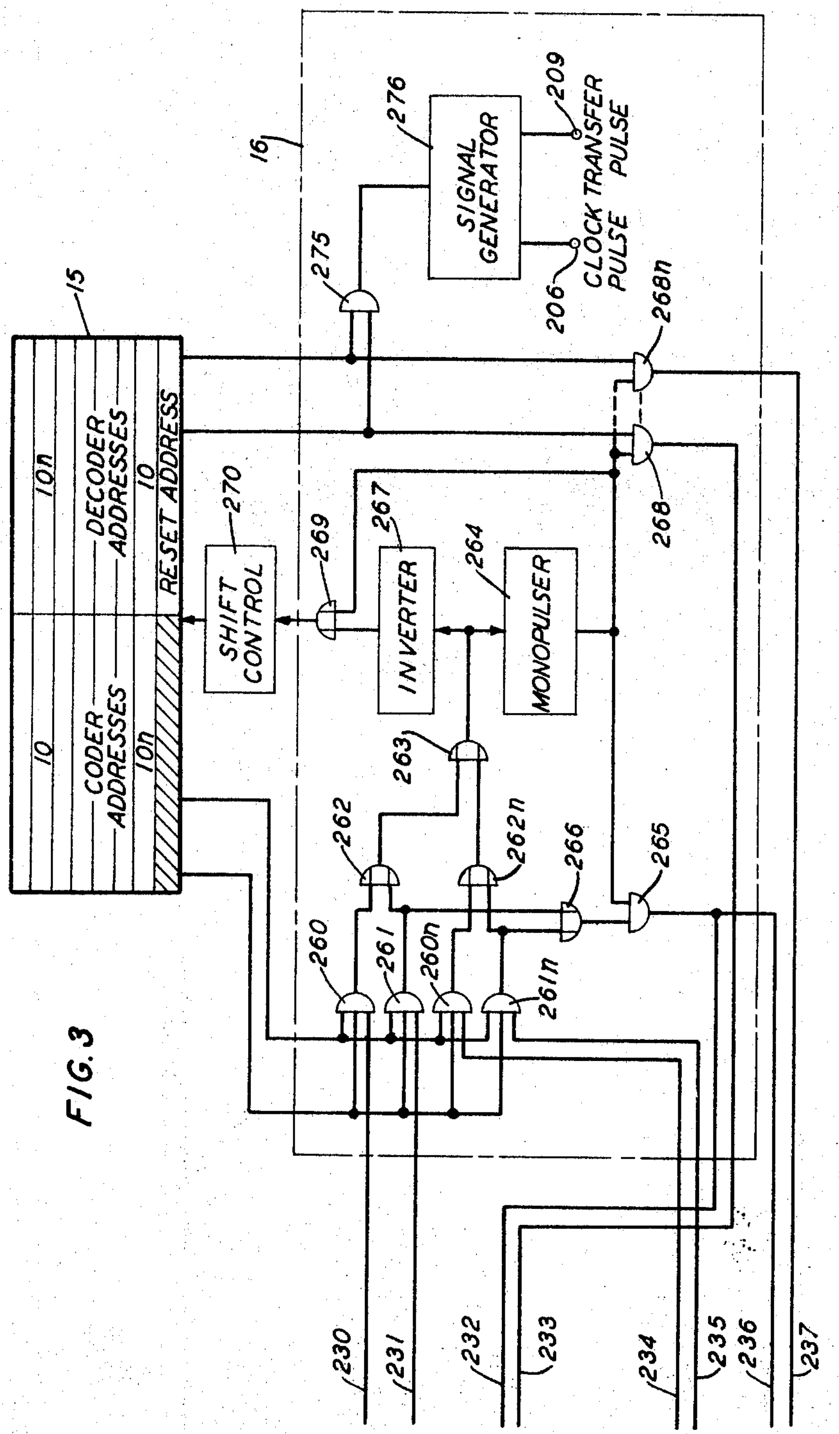

FIG. 1 depicts the elements of a communication system which are of interest with regard to one embodiment of the invention; and FIGS. 2 and 3 together illustrate the system depicted in FIG. 1 in greater detail.

Turning now to FIG. 1, a communication system is shown which comprises a plurality of telephone stations 10–10*n* each connected to common control circuitry through line circuits consisting of corresponding coders 11–11*n* and decoders 12–12*n*. Thus intelligence signals transmitted from one of the stations 10–10*n* will be appropriately coded in the corresponding coder 11–11*n* prior to receipt in the control circuitry. Similarly, intelligence signals incoming from another station will be received in stations 10–10*n* after decoding in the corresponding decoder 12–12*n* to place them in their original analog form.

The system control circuitry essential to a disclosure of the invention consists of a memory 15 and a scanner 16. Memory 15 contains the address of each "active" station; i.e., a station currently in communication with another station. The addresses of each pair of active stations are stored in distinct slots which are scanned in a reptitive cycle. In each slot the address of one station is stored in a coder address section, and the address of the other station is stored in a decoder address section. The positions are reversed in another memory slot to accomodate transmission in the opposite direction.

Scanner 16 comprises circuitry which automatically retrieves a pair of active station designations from memory 15 during a particular time interval designated hereinafter as a "time slot." The sequential address retrieval operation is stopped if, at the time of retrieval of the pair of active station designations, a control signal is received from the coder corresponding to the station having its address stored in the coder address section of memory 15. During the ensuing pause, a control pulse corresponding to the received control signal is applied to the decoder for the other active station in the pair. The sequential scan of memory 15 by scanner 16 then is reinitiated.

If a pair of active station designations is retrieved without concurrent receipt of a control signal from one of the pair of lines, the scan operation is continued without delay. Thus a time slot is utilized only for lines between which a signal transfer is required by a change in amplitude of the outgoing intelligence signal. These then are the basic operations required for transfer of intelligence signals through the communication system.

The elements depicted in FIG. 1 are those essential to the particular signal transfer operations just described, and they are illustrated in more detail in FIGS. 2 and 3 considered together. Of course, it should be recognized that a communication system comprises considerably more apparatus and circuitry than that disclosed. However, such circuitry, necessary to the establishment and supervision of call connections, is well known and readily available in the art. For example, a telephone system environment in which this signal transfer arrangement may be utilized is disclosed in H. Inose et al. Pat. 3,223,784, issued Dec. 14, 1965.

Turning then to FIGS. 2 and 3, stations 10–**10*n* are again depicted, together with the corresponding coders 11–11*n* and decoders 12–12*n*. In this instance memory 15 and scanner 16**, FIG. 3, are depicted in greater detail to illustrate the basic logic operations performed in realizing signal transfers between each pair of lines in communication.

Coders 11–**11*n*, FIG. 2, each comprise the elements depicted in coder 11; viz., differential amplifier 201, AND gates 202 and 204, inverter 203, "1" charge meter 213 containing a predetermined quantity of charge which is the analog equivalent of the binary "1" signal, "0" charge meter 214 containing a predetermined quantity of charge corresponding to the binary "0" signal and integrating capacitor 215**. With this arrangement the typical delta modulator operation, as known in the art, is achieved. Thus, for example, if the outgoing intelligence signal is increasing in amplitude, the delta modulator output may be a succession of binary "1's". If the signal is decreasing in amplitude, the delta modulator output then would be a succession of "0'.s" Finally with a steady state signal the delta modulator would generate a 101010 pattern.

In operation, a clock signal received from signal generator 276, FIG. 3, at coder 11, FIG. 2, via terminal 206 is applied to AND gates 202 and 204, which in turn are enabled in conjunction with the "1" or "0" signal respectively from differential amplifier 201. The output of AND gate 202 permits the storage in integrating capacitor 215 of the predetermined quantity of charge contained in meter 213. Similarly, the output of AND gate 204 permits the storage in capacitor 215 of the charge contained in meter 214. The net effect is the application to differential amplifier 201 of a charge on capacitor 215 corresponding to the output of differential amplifier 201.

The balance of coder 11 comprises elements which take advantage of these delta modulator outputs to effect a transfer of the intelligence signal only when its amplitude is changing. This recognizes, therefore, that a transfer of the 101010 pattern representing a silent interval is unnecessary, and when it is obviated, a dramatic decrease in the time the communication system must devote to each station connection through the system is realized.

Thus coder 11 includes comparison flip-flops 205 and 210 plus AND gates 207, 208, 211 and 212. Initially a transfer signal from signal generator 276 in scanner 16, FIG. 3, is applied via terminal 209 to AND gates 207 and 208. The particular one of these gates receiving the output of flip-flop 205 will be enabled to transfer the state of flip-flop 205 to flip-flop 210. Immediately thereafter, generator 276 provides a clock pulse via terminal 206 which enables the appropriate one of AND gates 202 and 204, dependent upon the type of binary signal received from amplifier 201, for storage in flip-flop 205.

Upon completion of this sequence, flip-flop 210 contains the previously coded signal sample from station 10, while flip-flop 205 contains the currently coded signal sample. These two stored signal samples are then compared by means of AND gates 211 and 212, with the comparison resultant being transmitted to scanner 16. Thus for example, if the previous sample, registered in flip-flop 210, is a "0" and the present sample, registered in flip-flop 205, is also a "0," AND gate 211 will provide an output "0" signal on lead 230 indicating this match or decline in signal amplitude between the consecutive signal samples. An opposite match, indicating an increase in signal amplitude, will, of course, permit AND gate 212 to provide an output "1" signal via lead 231 to AND gate 261 in scanner 16. If the stored samples are mismatched, indicating no amplitude change, no output signal will be provided by coder 11 during the current scan cycle.

Of course it is also necessary that, each time a match occurs between consecutive coded outgoing signals, a corresponding signal from coder 11 be transferred to decoder **12*n* for subsequent application to station 10*n*. Decoders 12–12*n* each comprise the elements depicted in decoder 12*n*; viz, amplifier 228, inverter 221, AND gates 220 and 222, "1" charge meter 225 containing a quantity of charge corresponding to that found in meter 213, "0" charge meter 226 containing a quantity of charge corresponding to that found in meter 214, and integrating capacitor 227. Thus a "1" signal provided to decoder 12*n* on lead 236 from scanner 16 is applied through AND gate 220 to meter 225, which in turn deposits its predetermined charge on capacitor 227. If the "0" signal is provided on lead 236, inverter 221 applies an enabling signal to AND gate 222 causing meter 226 to deposit its predetermined charge on capacitor 227. Thus the analog equivalent of the desired "1" or "0" signal is available at the input of amplifier 228. Upon receipt of an appropriate clock signal at this time, amplifier 228 is permitted to apply the resultant amplified analog signal to station 10*n***.

Memory 15, FIG. 3, may comprise a conventional ring shift register containing the address of the coder corresponding to one of a pair of active lines, followed by the address of a decoder corresponding to the other active line in the pair. Thus in the second slot, the address for line 10 is illustrated as being stored on the coder side and the address for line **10*n* on the decoder side. At this point in the sequential memory scan, therefore, the line 10 address will be applied to the corresponding AND gates 260 and 261 in scanner 16, and the decoder address of line 10*n* will be applied to AND gate 268*n*. Subsequently, address 10*n* will be retrieved from the coder address side of memory 15 and address 10** from the decoder side.

Scanner 16 consists of a monopulser 264, which provides the essential control pulses to the decoders and to shift control 270 to continue the memory scan. Various AND and OR logic gates supply activating signals to the monopulser and transfer the memory and monopulser outputs to the decoders and memory shift control. A signal generator 276 in scanner 16 provides transfer and clock signals to the coders upon receipt of a reset address from memory 15 at the end of each memory scan.

Assume then that scanner 16 has just retrieved the addresses of stations 10 and 10n from the respective coder and decoder sides of memory 15 during a sequential scan of all of the stored addresses in memory 15. The address of station 10 will be applied so as to enable AND gates 260 or 261 in conjunction with a control signal received concurrently from coder 11 on lead 230 or 231. An output of AND gate 260 or 261 will be applied to inverter 267 and monopulser 264 through OR gates 262 and 263. Inverter 267 acts in the presence of this output to prevent shift control 270 from continuing the memory scan. Thus the scan is stopped for the duration of the signal transfer operation. An output from monopulser 264 at this time will enable AND gate 265 in conjunction with receipt of an output from AND gate 261 through OR gate 266. This action results in the application of a "1" control pulse to decoder 12n via lead 236. An output "0" from AND gate 260 instead of the "1" from AND gate 261 at this time will fail to enable AND gate 265, thereby resulting in a "0" control signal being applied to decoder 12n on lead 236.

These control signals are directed to decoder 12n by the corresponding decoder address previously retrieved from memory 15 and applied through AND gates 268–268n in conjunction with the output of monopulser 264 applied through AND gate 265. Thus in the current time slot, receipt of a control signal from coder 11 on lead 230 or 231, representing a match in the binary state of consecutive intelligence signal samples received from station 10, will result in the application to decoder 12n of a "1" or "0" control pulse dependent upon the particular binary state of the successively received intelligence signal samples. Of course a mismatch of the consecutive signal samples in coder 11 will result in no signal being applied to decoder 12n.

Monopulser 264 also signals shift control logic 270 through OR gate 269 such that, at the end of the time slot in which the foregoing control operations are performed, the ring counter in memory 15 will be advanced to the next pair of addresses corresponding to active lines in communication.

If on the succeeding scan no signal is received from coder 11 during observation of the memory slot in which the corresponding address is stored on the coder side, AND gates 260 and 261 in scanner 16 will fail to provide an output. Scanner 16 in this instance will not pause for the predetermined signal transfer interval, but will immediately move on to the next coder address. This action is accomplished by inverter 267 providing an output signal in the absence of an output from OR gate 263. The output of inverter 267 is applied through OR gate 269 to activate shift control 270. In all cases in which a signal is received from the corresponding coder the shift control 270 will be activated only by the output of monopulser 263 through OR gate 269 at the end of a time slot interval.

Upon completion of a cycle through memory 15, during which time slots were made available only for signal transfer between those line pairs in which a "1" or a "0" match signal was detected, a reset address is retrieved from memory 15, which address enables AND gate 275 to activate generator 276. This action in turn provides the transfer control signal and the clock signal to all of the coders 11–11n. As indicated heretofore, these signals serve to advance the stored signal samples being compared in each coder.

Continuing with the previous example, let us consider now that station 10n provides a pair of consecutive intelligence signals, the comparison of which results in a mismatch so that coder 11n fails to provide an output on lead 234 or 235. At the time scanner 16 retrieves the address of station 10n from the coder side of memory 15 and the address of station 10 from the decoder side, the absence of a control signal from coder 11n will result in an immediate shift in the scan of memory 15 due to the failure of AND gate 260n or 261n to provide an output. Thus decoder 12 will fail to receive a control signal from scanner 16 on lead 232 at this time. In this instance then, the integrating capacitor in decoder 12 will not be charged to the "0" or "1" level during the current scan cycle. At the end of the cycle the output of generator 276 will be applied to all coders via terminals 206 and 209 in the usual manner.

It is evident then that a considerable time saving is realized by stopping the memory scan only when a match occurs between consecutive outgoing coded signal samples. This would occur less than one half of the time, since one party is talking while the other party is listening and sampling occurs more frequently than distinct matches. Thus the slot in memory 15 having the address of the listening station stored on the coder side will be skipped in each memory scan. Moreover, during a pause in the conversation the scanner may skip both memory slots assigned to this call connection. The same action is taken each time the level of consecutive intelligence signal samples remains unchanged so that the resultant coded output oscillates between the "1" and "0" states.

It is to be understood that the above described arrangements are illustrative of the application of the principles of the invention. Numerous other arrangements may be devised by those skilled in the art without departing from the spirit and scope of the invention.

What is claimed is:

1. A dynamic signal transfer system comprising a plurality of stations including first and second stations in communication and means for transferring signals between said first and second stations comprising means for coding signal samples received from said first station, means connected to said coding means for comparing consecutive coded signal samples, means for generating a control signal indicating a comparison match, means for scanning the addresses of said stations in communication in sequence, means for inhibiting the scan upon receipt in said scanning means of one of said control signals from said first station concurrent with the scan of said first station address and means responsive to receipt of said control signal from said first station for enabling the application to said second station of a signal corresponding to said consecutive coded signal samples.

2. A communication system comprising a plurality of stations, a coder and a decoder associated with each of said stations, a memory containing coder and decoder addresses for each pair of stations in communication, a scanner for retrieving said addresses from said memory in a regular sequence, and means for transferring intelligence signals through said system from a first station to a second station comprising means in each of said coders for storing representations in binary code form of a pair of intelligence signal samples received in sequence from the corresponding station, means for transmitting a control signal from each of said coders to said scanner upon storage in said coder means of a pair of intelligence signal samples coded in the same binary form, means operative upon receipt in said scanner of a control signal from said first station coder concurrent with retrieval of said second station decoder address from said memory for applying a control pulse to said second station decoder and means in said second station decoder operative upon receipt of said control pulse to generate a signal corresponding to said pair of intelligence signal samples and to apply said generated signal to said second station.

3. A communication system comprising a plurality of stations, means associated with each of said stations for coding outgoing signals and for decoding incoming signals and means for realizing a signal transfer between first and second ones of said stations comprising means for enabling said second station decoding means to transfer a signal to said second station corresponding to each matching pair of coded signals transmitted in sequence from said first station.

4. A communication system in accordance with claim 3 wherein said enabling means comprises means for comparing a pair of outgoing signals received in sequence from said first station coding means, and means responsive to a comparison match in said first station comparing means for applying a control signal to said second station decoding means.

5. A communication system in accordance with claim 4 wherein said coding means comprises a delta modulator, and said comparing means comprises a pair of flip-flops connected in series for storing the current signal sample and the previous signal sample received in coded form from said delta modulator.

6. In a communication system, the method of transferring information between first and second stations in communication comprising the steps of coding the signals outgoing from the first station, comparing a pair of consecutive coded outgoing signals, and applying a signal to said second station corresponding to the compared signals only when a comparison match is detected.

7. A communication system comprising a plurality of stations, a plurality of coders and decoders, one coder and one decoder being associated with each of said stations, a memory containing coder and decoder addresses for each pair of stations in communication and a scanner for retrieving said addresses from said memory in a regular sequence, characterized in that intelligence signals are transferred through the system from a first station to a second station by utilizing said second station decoder address as retrieved from said memory concurrent with receipt in said scanner of a control signal from said first station coder responsive to a match between successive coded outgoing intelligence signals to generate in said second station decoder an incoming intelligence signal corresponding to said successive coded outgoing intelligence signals.

8. A communication system in accordance with claim 7, characterized in that said scanner comprises means for stopping the sequential scanning of said memory to generate said incoming intelligence signal only upon receipt in said scanner of said control signal indicating a match between successive coded outgoing intelligence signals.

9. A communication system in accordance with claim 7, characterized in that said scanner comprises means operative upon completion of each memory scan for activating each of said station coders to advance the stored signals for comparison of the next successive pair of coded outgoing intelligence signals.

10. A signal transfer system comprising a plurality of stations, a plurality of apparatus each associated with one of said stations for coding outgoing signals and for decoding incoming signal codes, a control circuit comprising a memory unit storing designations of said stations, and a scanning circuit for applying said incoming signal codes to said decoding means in response to the processing of the corresponding station designation received from said memory unit, characterized in that the frequency of application of said incoming signal codes to said decoding apparatus associated with a particular one of said stations varies according to the detection in said coding apparatus of a matching pair of outgoing signal codes signifying a change in said outgoing signal from the station with which said particular station is in communication.

11. A signal transfer system in accordance with claim 10 characterized in that means in said scanning circuit inhibit the scanning of said memory only upon detection of a matching pair of outgoing signal codes, a time slot in a repetitive cycle is assigned to said particular station and a first control pulse is applied to said decoding apparatus at said particular station during said assigned time slot.

12. A signal transfer system in accordance with claim 10, characterized in that at the end of a scanning cycle means in said scanning circuit apply control signals to the coding apparatus associated with each of said stations to permit comparison of a subsequent pair of outgoing signal codes in the next repetitive cycle.

References Cited

UNITED STATES PATENTS

| | | | |
|---|---|---|---|
| 3,030,447 | 4/1962 | Saal | 179—15 |
| 3,306,979 | 2/1967 | Ingram | 179—15 |
| 3,447,147 | 5/1969 | Deregnaucourt | 179—15 |

KATHLEEN H. CLAFFY, Primary Examiner

A. B. KIMBALL, Jr., Assistant Examiner

U.S. Cl. X.R.

179—10